United States Patent [19]

Koch et al.

[11] Patent Number: 4,930,882
[45] Date of Patent: Jun. 5, 1990

[54] ADJUSTABLE MICROSCOPE FOCUSING DRIVE

[75] Inventors: Herbert Koch, Biebertal; Peter Weimar, Staufenberg, both of Fed. Rep. of Germany

[73] Assignee: Ernst Leitz Wetzlar GmbH, Wetzlar, Fed. Rep. of Germany

[21] Appl. No.: 277,953

[22] Filed: Nov. 30, 1988

[30] Foreign Application Priority Data

Dec. 1, 1987 [DE] Fed. Rep. of Germany ... 8715891[U]

[51] Int. Cl.⁵ .............................................. G02B 21/26
[52] U.S. Cl. ..................................... 350/530; 350/521
[58] Field of Search ................ 350/521, 530; 318/592, 318/593, 594, 595, 596

[56] References Cited

U.S. PATENT DOCUMENTS

| | | |
|---|---|---|
| 3,798,449 | 3/1974 | Reinheimer et al. ................ 350/530 |
| 4,531,816 | 7/1985 | Baumgartel ......................... 350/521 |
| 4,653,878 | 3/1987 | Nakasato et al. .................... 350/530 |

FOREIGN PATENT DOCUMENTS

| | | |
|---|---|---|
| 2262614 | 7/1974 | Fed. Rep. of Germany . |
| 3410201 | 10/1984 | Fed. Rep. of Germany . |
| 8606168.2 | 8/1986 | Fed. Rep. of Germany . |
| 3607379 | 7/1987 | Fed. Rep. of Germany . |

Primary Examiner—Jon W. Henry
Attorney, Agent, or Firm—Foley & Lardner, Schwartz, Jeffery, Schwaab, Mack, Blumenthal & Evans

[57] ABSTRACT

In an electromotively adjustable focusing system for a microscope, a rotatable and axially moveable knob controls both the coarse and fine adjustments of the object stage. The knob is mechanically connected to a tachogenerator producing an output voltage responsive to the direction and amount of rotation of the knob. The knob is also mechanically joined to a switch, which is opened or closed by axial movement of the knob in opposite directions. The closing of the switch causes a focus control circuit to provide to the focusing motor a signal that causes coarse (rapid) focusing. When the switch is opened, however, the motor provides fine adjustment of the object stage.

17 Claims, 1 Drawing Sheet

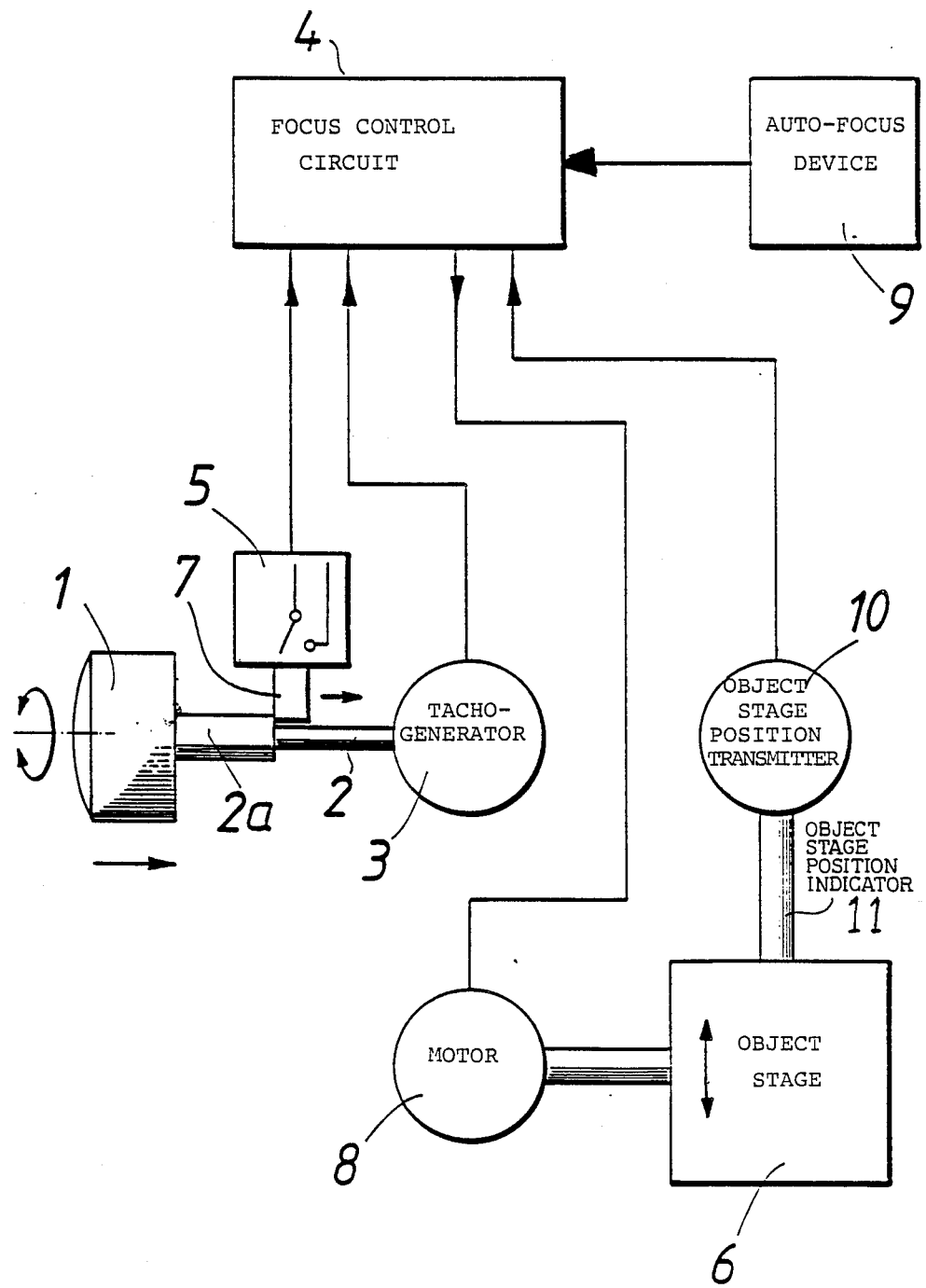

ADJUSTABLE MICROSCOPE FOCUSING DRIVE

BACKGROUND OF THE INVENTION

The invention relates to an electromotively adjustable, focusing drive for a microscope. The microscope may be finely or coaxially adjusted by a manual control.

One prior art device having conventional fine-setting knobs is disclosed in German Offenlegungsschrift No. 3,410,201. These manually operated knobs, located on the microscope, are mechanically connected by means of a shaft to the object stage adjustment mechanism. A motor coupled to the shaft via a magnetically shiftable clutch and gearing means effects a moving object stage coarse adjustment. The disadvantages of this system, however, are the large number of components that must be mechanically moved and the associated high manufacturing costs.

An electromotive drive for the focusing of a microscope objective is disclosed in German Offenlegungsschrift No. 2,262,614. For both the coarse and fine drives, an electric motor, in each case, is connected via a gearing means to the object stage, which is displaceable in the z direction. On the microscope foot, two rotary switch knobs are arranged, these being rigidly interconnected via a shifter rod. By turning the switch knobs to certain positions, electric contacts operate, which, in turn, close the circuit to operate either the fine setting motor or the coarse setting motor.

Apart from the considerable mechanical elements required, operating one of the switch knobs has the effect of triggering only one signal, either for the coarse drive or the fine drive. It is not possible, however, to perform a sensitive focus setting by a corresponding, rotary movement of the switch knob.

A device for the manual operation of an electromotively adjustable focusing drive is known from German Utility Model No. 8,606,168. In this publication, a control desk separate from the microscope is disclosed, in which case a handwheel for the manual fine adjustment of the focusing drive is connected to a digitally operating encoder. By operation of the handwheel, digital pulse sequences are generated via the encoder and fed to a downstream control circuit. The latter then controls the motively adjustable focusing drive. Apart from the considerable circuitry needed, a further disadvantage is that no combined coarse-fine adjustment, by means of a single manually adjustable control element, is possible.

SUMMARY OF THE INVENTION

One object of the invention, therefore, is to provide an electromotively operated focusing drive for a microscope in which one knob controls both the movement of the object stage and the selection of a coarse or fine focusing adjustment.

Another object of the invention is to provide a microscope which may be focused by a manually adjustable control knob and electrical means responsive to the movement of the knob.

A further object of the invention is to provide an electromotively adjustable microscope in which the adjustment means is responsive to an autofocus device.

Still another object of the invention is to provide an electromotively operated focusing means for a microscope which can be controlled from a location away from the microscope.

A still further object of the invention is to provide a system for electromotively focusing a microscope in which the electromotive means is controlled by both the manual rotation and axial movement of a knob.

Another object of the invention is to provide an adjustment system without extra mechanical parts, in which electromotively operated coarse-fine adjustments can be achieved with only one setting knob.

In accomplishing the foregoing objects, there is provided in accordance with the present invention an electromotively adjustable microscope focusing system comprising an adjustable microscope object stage; means for electromotively moving the object stage and, thereby, focusing the microscope; means for generating selective electrical signals, such signals causing either coarse or fine adjustment of the microscope; means for manually controlling the output of the electrical signal generating means; and means for applying the selectively generated electrical signals to the electromotive moving means, whereby the microscope is, in response, respectively coarsely or finely focused.

The manual control device can take the form of a single knob, capable of both rotation and axial movement. Rotation of the knob controls the direction and speed of movement of the microscope object stage. The axial movement of the knob, depending on its direction, operates a switch that provides to a focusing motor a coarse or a fine adjustment electric current.

Other objects, features and advantages of the present invention will become apparent from the following detailed description of the preferred embodiment. It should be understood, however, that the detailed description and the preferred embodiment are given by way of illustration only. Various changes and modifications within the spirit and scope of the invention will become apparent to those skilled in the art.

BRIEF DESCRIPTION OF THE DRAWING

The Figure is an electro-mechanical schematic depiction of the present invention, including the manual control means and the associated circuit components.

DETAILED DESCRIPTION OF THE PREFERRED EMBODIMENT

The Figure shows an electromotively adjustable microscope focusing system including an axially displaceable, rotary setting knob 1, which is affixed on a sleeve 2a. The latter may be internally coupled, for example, via suitable toothing, to a shaft 2. The shaft 2 is mechanically connected to a direct-current tacho-generator 3, which is, in turn, electrically connected to a focus control circuit 4.

A mechanically operated, electric change-over switch 5 is mechanically connected via a lever 7, pivotal in the direction of the arrow, to the sleeve 2a in such a way that an electric contact is closed by an axial displacement of the setting knob 1. An electric line connects this change-over switch 5 to the focus control circuit 4. Also shown are an object stage 6, a focus setting motor 8 arranged thereupon, an autofocus device 9 and an object stage position transmitter 10. The motor 8, the autofocus device 9 and the position transmitter 10 and indicator 11 are, in each case, electrically connected to the focus control circuit 4.

By turning the setting knob 1, a voltage proportional to the rotary movement and direction of knob rotation is generated, via the shaft 1, by the direct-current tachogenerator 3. This voltage is fed to the focus control circuit 4. A control device contained in the focus control circuit 4 supplies a corresponding current to the motor 8, for adjustment of the object stage 6.

By pushing the setting knob 1 in the direction of the arrow, i.e., toward the generator 3, the change-over switch 5 is operated and, thus, a contact therein is closed. As a result, the coarse drive signal, for example, is triggered in the focus control circuit 4. By holding the setting knob 1 in this position or locking it by means of locking means, not shown, and simultaneously turning it (note the circular arrow), a voltage is again generated in the generator 3 and fed to the control circuit 4. The coarse drive signal produces in the control circuit 4, however, a gain in the voltage emitted by the generator 3. Thus, more current is fed to the motor 8 and a quick or coarse adjustment of the object stage 6 takes place.

In order to eliminate operator errors, the control circuit 4 is connected to an object stage position transmitter 10. In the case of relatively small distances between the object stage 6 and the objective (not shown), therefore, the coarse drive signal is ignored by the control circuit 4.

The additional autofocus device 9 makes possible an automatic sharp setting or detection of the still free object stage—objective free working distance. A corresponding signal can be fed to the focus control circuit 4 and effect a gain of the signal, dependent on the free working distance, for actuation of the motor 8.

With the present innovation, a combination of manual and electromotive focus settings are achieved, with automatically operating safety devices acting directly on the electrical control device 4 without additional mechanical apparatus.

Such a design of the manual means for selectively adjusting the coarse or fine drives is particularly advantageous if the operating elements are arranged physically separate from the microscope, for example, in an external control desk.

What is claimed is:

1. An electromotively adjustable focusing system for a microscope comprising:
   an adjustable microscope object stage;
   means for electromotively moving the object stage and, thereby, focusing the microscope;
   a generator for generating selective electrical signals, such signals causing either coarse or fine adjustment of the microscope;
   means for manually controlling the output of the generator, said generator producing electrical signals proportional to the degree of movement of said manual control means; and
   means for applying the selectively generated electrical signals to the electromotive moving means, whereby the microscope is, in response, respectively coarsely or finely focussed.

2. The electromotively adjustable focusing system of claim 1, wherein the generator comprises a tacho-generator.

3. The electromotively adjustable focusing system of claim 1, wherein the electromotive moving means is an electric motor.

4. An electromotively adjustable focusing system, for a microscope comprising:
   an adjustable microscope objective stage;
   means for electromotively moving the object stage, and thereby, focusing the microscope;
   means for generating selective electrical signals, such signals causing either coarse or fine adjustment of the microscope;
   means for manually controlling the output of the electrical signal generating means; and
   means for applying the selectively generated electrical signals to the electromotive moving means, whereby the microscope is, in response, respectively coarsely or finely focussed, wherein the manual control means is a knob capable of simultaneous or separate rotation and axial movement, the rotation of the knob controlling the direction of movement of the object stage and the axial movement of the knob selectively causing course or fine focusing.

5. The electromotively adjustable focusing system of claim 4, wherein the manual control means further includes a switch, the switch being opened or closed in response to the axial movement of the knob to provide respectively to the motor a fine or a coarse adjustment signal.

6. The electromotively adjustable focusing system of claim 1, further including means for indicating the position of the object stage, the indicating means providing a signal that cancels the coarse adjustment signal when the object stage cannot safely be coarsely adjusted.

7. The electromotively adjustable focusing system of claim 1, further including means for automatically focusing the microscope, the automatic focusing means being operatively connected to the electrical signals applying means to control the direction and speed of the electromotive moving means.

8. An electromotively adjustable focusing system for a microscope comprising:
   an adjustable microscope object stage;
   means for electromotively moving the object stage and, thereby, focusing the microscope;
   means for generating electrical signals, which signals selectively cause movement of the object stage in the desired direction and with the desired speed;
   means for manually controlling the output of the electrical signal generating means; and
   means for operatively connecting the electromotive moving means to the electrical signal generating means;
   wherein the manual control means is a knob capable of simultaneous or separate rotation and axial movement, the direction of rotation determining the direction of movement of the object stage and the direction of axial movement of the knob selectively causing a fine or coarse focusing adjustment.

9. The electromotively adjustable focusing system of claim 8, wherein the electrical signal generating means includes a tacho-generator providing output signals responsive to the direction of rotation of the knob.

10. The electromotively adjustable focusing system of claim 8, wherein the manual control means includes a switch, the switch being selectively opened and closed by the axial movement of the knob in opposite directions, movement of the knob in one direction causing the operative connecting means to generate signals effecting a coarse focusing adjustment of the microscope and movement of the knob in the other direction causing the operative connecting means to generate signals effecting a fine focusing adjustment of the microscope.

11. The electromotively adjustable focusing system of claim 8, further including an object stage position indicator connected to the operative connecting means to cancel a coarse focusing adjustment of the microscope when the object stage cannot safely be coarsely adjusted.

12. The electromotively adjustable focusing system of claim 8, further including an automatic focus means.

13. The electromotively adjustable focusing system of claim 8, wherein the knob is remotely located from the microscope.

14. An electromotively adjustable focusing drive for a microscope comprising:
  a rotatable adjusting knob;
  a generator mechanically connected to the adjusting knob for converting its rotational movement into a proportional electrical voltage;
  an electric change-over switch mechanically linked to the adjusting knob and operated by the axial movement of the adjusting knob; and
  a focus control circuit for receiving voltage outputs from the generator indicative of the direction of adjustment and electrical signals from the switch selectively indicative of a coarse or fine adjustment.

15. The focusing drive of claim 14, wherein the electric change-over switch is actuated by a lever attached thereto and mechanically linked to the adjustment knob.

16. The focusing drive of claim 14, wherein the generator is a direct current tacho-generator.

17. A control system for an electromotively adjustable microscope focusing system comprising:
  a manual control means capable of both rotation and axial movement;
  a motor for adjusting a microscope;
  a generator for providing an output voltage proportional to the rotational movement and direction of rotation of the manual control means; and
  a switch mechanically connected to the manual control means and responsive to axial movement of said manual control means, where said axial movement in one direction generates signals that cause the microscope to be finely focused and said axial movement in the opposite direction generates signals that cause the microscope to be coarsely focused.

* * * * *